(12) United States Patent
Karigiannis et al.

(10) Patent No.: US 10,947,849 B2
(45) Date of Patent: Mar. 16, 2021

(54) SYSTEMS AND METHODS FOR RECONTOURING ENGINE COMPONENTS

(71) Applicant: General Electric Company, Schenectady, NY (US)

(72) Inventors: John Karigiannis, Laval (CA); Jessen Compagnat, Bromont (CA)

(73) Assignee: General Electric Company, Schenectady, NY (US)

( * ) Notice: Subject to any disclaimer, the term of this patent is extended or adjusted under 35 U.S.C. 154(b) by 388 days.

(21) Appl. No.: 15/634,223

(22) Filed: Jun. 27, 2017

(65) Prior Publication Data

US 2018/0371914 A1  Dec. 27, 2018

(51) Int. Cl.

| | |
|---|---|
| *F01D 5/00* | (2006.01) |
| *G05B 19/4099* | (2006.01) |
| *G06N 3/04* | (2006.01) |
| *B23P 6/00* | (2006.01) |
| *G05B 19/404* | (2006.01) |
| *F01D 5/14* | (2006.01) |
| *F04D 29/38* | (2006.01) |
| *G06N 3/08* | (2006.01) |

(52) U.S. Cl.
CPC .............. *F01D 5/005* (2013.01); *B23P 6/002* (2013.01); *B23P 6/007* (2013.01); *F01D 5/141* (2013.01); *F04D 29/384* (2013.01); *G05B 19/404* (2013.01); *G05B 19/4099* (2013.01); *G06N 3/0454* (2013.01); *G06N 3/08* (2013.01); *B23P 2700/01* (2013.01); *F05D 2220/32* (2013.01); *F05D 2230/80* (2013.01); *G05B 2219/45147* (2013.01)

(58) Field of Classification Search
CPC ... F01D 5/005; G05B 19/404; G05B 19/4099; G06N 3/0454
See application file for complete search history.

(56) References Cited

U.S. PATENT DOCUMENTS

| | | |
|---|---|---|
| 5,778,381 A | 7/1998 | Sandifer |
| 6,535,890 B2 | 3/2003 | Sandifer |
| 6,701,615 B2 | 3/2004 | Harding et al. |
| 6,915,236 B2* | 7/2005 | Tanner ................... B23P 6/002 29/402.08 |
| 7,039,485 B2 | 5/2006 | Engelbart et al. |
| 7,715,943 B2 | 5/2010 | Loda |

(Continued)

FOREIGN PATENT DOCUMENTS

GB  2350809 A  12/2000

OTHER PUBLICATIONS

Joze Balic, Neural-Network-Based Numerical Control for Milling Machine, Journal of Intelligent and Robotic Systems (Year: 2004).*

(Continued)

*Primary Examiner* — Christopher M Koehler
*Assistant Examiner* — Kyle A Cook
(74) *Attorney, Agent, or Firm* — Dority & Manning, P.A.

(57) ABSTRACT

Systems and methods that include and/or leverage a cluster of machine-learned models to recontour components of gas turbine engines are provided. In one exemplary aspect, the systems and methods leverage a cluster of machine-learned models to predict repair machining offsets for certain sections of the component that can be used to adjust or set a material removal tool path.

19 Claims, 10 Drawing Sheets

(56) References Cited

U.S. PATENT DOCUMENTS

| | | | |
|---|---|---|---|
| 7,797,828 B2* | 9/2010 | Beeson | B23P 6/007 |
| | | | 29/888 |
| 7,970,555 B2 | 6/2011 | Kernozicky et al. | |
| 8,096,030 B2 | 1/2012 | Graichen | |
| 8,442,665 B2 | 5/2013 | Krause | |
| 8,701,287 B2 | 4/2014 | Holze et al. | |
| 2003/0167616 A1 | 9/2003 | Harding et al. | |
| 2004/0262277 A1* | 12/2004 | Mika | F01D 21/003 |
| | | | 219/121.85 |
| 2012/0077417 A1* | 3/2012 | Derrien | B23P 6/00 |
| | | | 451/5 |
| 2012/0291035 A1* | 11/2012 | Barth | G05B 19/0421 |
| | | | 718/102 |
| 2014/0257543 A1 | 9/2014 | Rhodes et al. | |
| 2016/0075028 A1 | 3/2016 | Bain et al. | |
| 2016/0082664 A1 | 3/2016 | Snyder et al. | |

OTHER PUBLICATIONS

X. Li et al., Fuzzy Neural Network Modelling for Tool Wear Estimation in Dry Milling Operation, Annual Conference of the Prognostics and Health Management Society (Year: 2009).*

Kevin Murnane, What is Deep Learning and How is it Useful?, Forbes, Published Apr. 1, 2016, available at https://www.forbes.com/sites/kevimurnane/2016/04/01/what-is-deep-learning-and-how-is-it-useful/#468e439ed547 (Year: 2016).*

Modern Machine Shop, Parallel Processing Speeds Toolpath Calculations, https://www.mmsonline.com/articles/parallel-processing-speeds-toolpath-calculations, Published Sep. 21, 2009 (Year: 2009).*

Extended European Search Report and Opinion issued in connection with corresponding EP Application No. 18179784.6 dated Nov. 8, 2018.

Office Action Corresponding to CA Application 3008335 dated Apr. 8, 2019.

* cited by examiner

SYSTEMS AND METHODS FOR RECONTOURING ENGINE COMPONENTS

FIELD

The present subject matter relates generally to repairing components of gas turbine engines. More particularly, the subject matter relates to systems and methods for recontouring damaged components of gas turbine engines.

BACKGROUND

Turbomachinery components of gas turbine engines are subjected to extreme conditions during operation. Thus, such components deteriorate over time. Due to the high value of certain turbomachinery components (e.g., compressor and turbine blades), many times such damaged components are removed from the engine and repaired by a blade regeneration process. The blade regeneration process typically includes pre-treating the blade, depositing material onto the blade (e.g., the blade tip), recontouring the blade to desired specifications, and subjecting the blade to one or more post-treatment processes.

Recontouring turbomachinery components has conventionally been an iterative and time consuming process. In a typical recontouring process, a component is first inspected such that an operator can determine a machine offset, the component is then machined using the manually-determined machine offset, and the process iterates between inspection and machining until the component is recontoured to desired specifications. The recontouring process of engine blades has conventionally required manual intervention to determine the machine offset due to the significant part-to-part variation in the deterioration of the blades, the geometrical shape of the blades, the wear on the machining tool used to recontour the components (e.g., the wear on a belt of a grinder), and the uncertainties of the overall recontouring system. Accordingly, attempts at automating the recontouring process have been unsuccessful.

Therefore, improved systems and methods for recontouring components of gas turbine engines would be useful. More specifically, systems and methods for automating the recontouring process for components of gas turbine engines would be beneficial.

BRIEF DESCRIPTION

Exemplary aspects of the present disclosure are directed to methods and systems for recontouring components of gas turbine engines. Aspects and advantages of the invention will be set forth in part in the following description, or may be obvious from the description, or may be learned through practice of the invention.

One exemplary aspect of the present disclosure is directed to a method for recontouring a component defining one or more sections. The method includes obtaining, by one or more computing devices, a data set that includes one or more subsets each including one or more parameters indicative of a condition of one of the sections of the component. The method further includes inputting, by the one or more computing devices, the data set into a cluster of machine-learned models, each subset being input into a respective machine-learned model. The method also includes determining, by the one or more computing devices, a machine offset for each section of the component based at least in part on the one or more parameters indicative of the condition of the section. In addition, the method includes obtaining, by the one or more computing devices, the machine offset for each section of the component as outputs of their respective machine-learned models. The method also includes adjusting, by the one or more computing devices, a material removal tool path based at least in part on the machine offsets. The method further includes machining the component utilizing the material removal tool path.

Another exemplary aspect of the present disclosure is directed to a method for recontouring a component of a gas turbine engine using a recontouring system, the component defining a plurality of sections. The method includes obtaining, by one or more computing devices, a data set that includes a plurality of subsets, each subset includes one or more parameters indicative of a condition of one of the sections of the component and a condition of the recontouring system. The method also includes inputting, by the one or more computing devices, the data set into a machine-learned model that includes a plurality of neural networks, each subset being input into a respective neural network. The method further includes determining, by the one or more computing devices, a machine offset for each section of the component based at least in part on the one or more parameters indicative of the condition of the section and the condition of the recontouring system. The method additionally includes obtaining, by the one or more computing devices, the machine offset for each section of the component as outputs of their respective neural networks. The method further includes adjusting, by the one or more computing devices, a material removal tool path based at least in part on the machine offsets.

Another exemplary aspect of the present disclosure is directed to a recontouring system for recontouring a component of a gas turbine engine, the component defining a plurality of sections. The recontouring system includes an inspection device for scanning the sections of the component. The recontouring system also includes a material removal tool for removing an amount of material from the component. The recontouring system further includes one or more computing devices communicatively coupled with the inspection device and the material removal tool and configured to: obtain a data set that includes a plurality of subsets, each subset includes one or more parameters indicative of a condition of one of the sections of the component and a condition of the recontouring system; input the data set into a machine-learned model that includes a plurality of neural networks, each subset being input into a respective neural network; determine a machine offset for each section of the component based at least in part on the one or more parameters indicative of the condition of the section and the condition of the recontouring system; obtain the machine offset for each section of the component as outputs of their respective neural networks; and adjust a material removal tool path based at least in part on the machine offsets.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
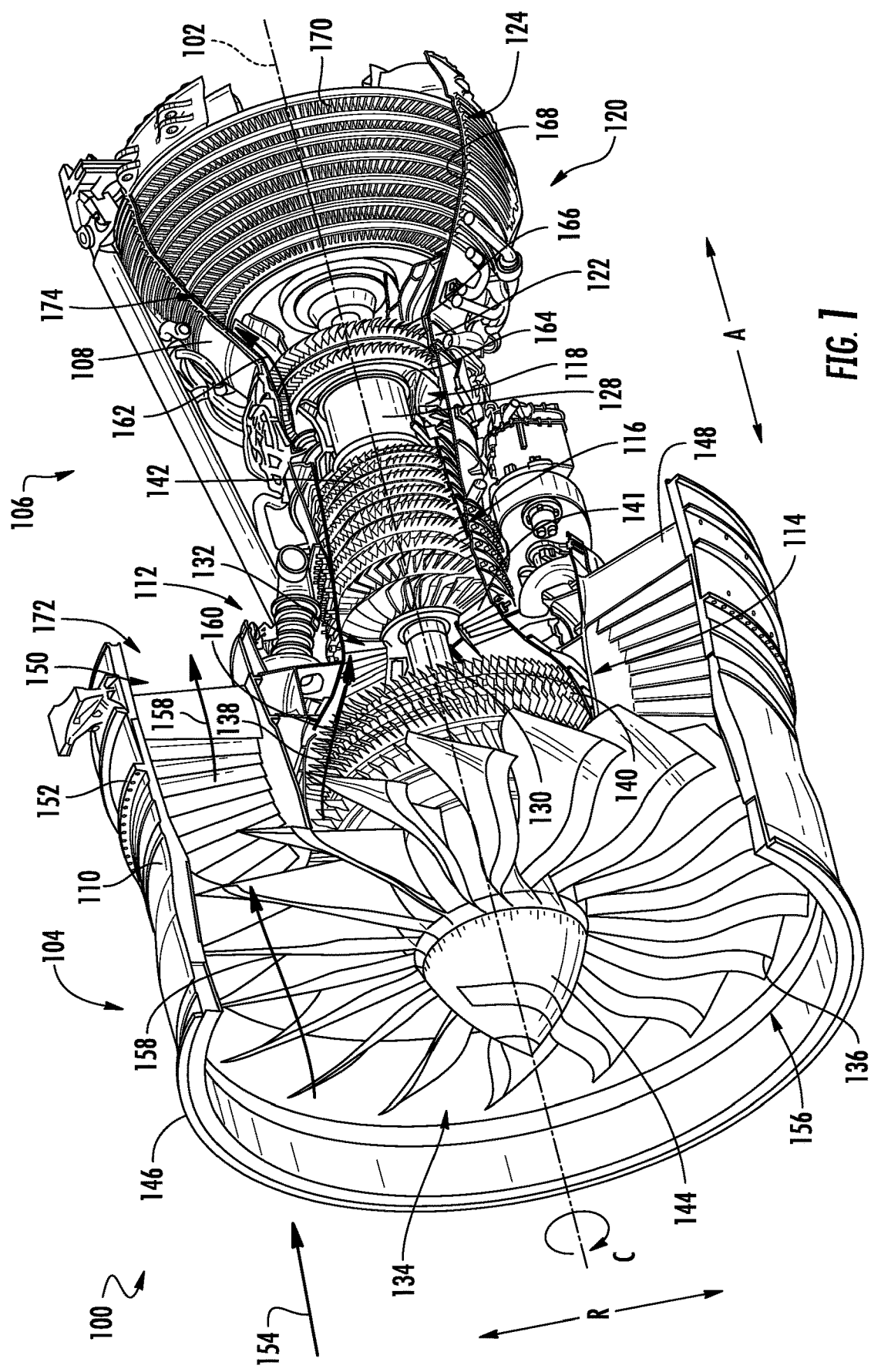
FIG. 1 provides a cutaway perspective view of an exemplary engine according to an exemplary embodiment of the present disclosure.

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations that come within the scope of the appended claims and their equivalents.

Exemplary aspects of the present disclosure are directed to methods and systems for recontouring components of gas turbine engines. More particularly, exemplary aspects of the present disclosure are directed to systems and methods that include and/or leverage a cluster of machine-learned models, such as deep neural networks, to determine machine offsets for particular sections of a component. The machine offsets can then be used to adjust a material removal tool path of a material removal tool in real time. In this way, such components can be recontoured to desired specifications with high accuracy and without need for time consuming, iterative steps. Accordingly, the systems and methods of the present disclosure include features that reduce the component regeneration cycle time and produce recontoured components with high accuracy.

Further aspects and advantages of the present subject matter will be apparent to those of skill in the art. Exemplary aspects of the present disclosure will be discussed in further detail with reference to the drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis. Moreover, the term "obtaining" means affirmatively or passively gaining, attaining, acquiring, collecting, or otherwise receiving the noted object, information, signals, data, transmission, etc.

Turning now to the drawings, FIG. 1 provides a cutaway perspective view of an exemplary engine according to an exemplary embodiment of the present disclosure. For this exemplary embodiment, the engine is configured as a gas turbine engine 100. More particularly, the gas turbine engine 100 depicted in FIG. 1 is an aeronautical, high-bypass turbofan jet engine operatively configured to be mounted to or integral with an aircraft. The gas turbine engine 100 defines an axial direction A (extending parallel to or coaxial with a longitudinal centerline 102 provided for reference), a radial direction R, and a circumferential direction C extending about the axial direction A. The gas turbine engine 100 includes a fan section 104 and a core turbine engine 106 disposed downstream of the fan section 104.

The exemplary core turbine engine 106 depicted includes a substantially tubular outer casing 108 that defines an annular inlet 110. The outer casing 108 encases, in serial flow relationship, a compressor section 112 including a booster or LP compressor 114 and an HP compressor 116; a combustion section 118; a turbine section 120 including an HP turbine 122 and a LP turbine 124; and a jet exhaust nozzle section (not depicted). An HP shaft or spool 128 drivingly connects the HP turbine 122 with the HP compressor 116. A LP shaft or spool 130 drivingly connects the LP turbine 124 with the LP compressor 114. The compressor section 112, combustion section 118, turbine section 120, and jet exhaust nozzle section together define a core air flowpath 132 through the core turbine engine 106.

The fan section 104 includes a fan 134 having a plurality of fan blades 136 coupled to a disk in a circumferentially spaced apart manner. As depicted, the fan blades 136 extend outwardly from the disk generally along the radial direction R. The fan blades 136 and the disk are together rotatable about the longitudinal centerline 102 by the LP shaft 130.

Referring still to the exemplary embodiment of FIG. 1, the disk is covered by rotatable spinner 144 aerodynamically contoured to promote an airflow through the plurality of fan blades 136. Additionally, the exemplary fan section 104 includes an annular fan casing or outer nacelle 146 that circumferentially surrounds the fan 134 and/or at least a portion of the core turbine engine 106. Moreover, the nacelle 146 is supported relative to the core turbine engine 106 by a plurality of circumferentially spaced outlet guide vanes 148. Further, a downstream section 150 of the nacelle 146 extends over an outer portion of the core turbine engine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air as indicated by arrows 158 is directed or routed into the bypass airflow passage 152 and a second portion of the air as indicated by arrow 160 is directed or routed into the LP compressor 114 of the core turbine engine 106. The pressure of the second portion of air 160 is then increased as it passes across various stages of LP compressor stator vanes 138 (not shown extending annularly about the longitudinal centerline 102) and LP compressor blades 140. The air 160 then flows downstream to the HP compressor 116 where the air 160 is progressively compressed further by various stages of HP compressor stator vanes 141 (not shown extending annularly about the longitudinal centerline 102) and HP compressor blades 142. Thereafter, the compressed air is routed to the combustion section 118.

The compressed second portion of air 160 discharged from the compressor section 112 mixes with fuel and is burned within the combustion section 118 to provide combustion gases 162. The combustion gases 162 are routed from the combustion section 118 along the hot gas path 174, through the HP turbine 122 where a portion of thermal and/or kinetic energy from the combustion gases 162 is extracted via sequential stages of HP turbine stator vanes 164 (not shown extending annularly about the longitudinal centerline 102) that are coupled to the outer casing 108 and HP turbine rotor blades 166 that are coupled to the HP shaft or spool 128, thus causing the HP shaft or spool 128 to rotate, thereby supporting operation of the HP compressor 116. The combustion gases 162 are then routed through the LP turbine 124 where a second portion of thermal and kinetic energy is extracted from the combustion gases 162 via sequential stages of LP turbine stator vanes 168 (not shown extending annularly about the longitudinal centerline 102) that are coupled to the outer casing 108 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section of the core turbine engine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section at least partially define a hot gas path 174 for routing the combustion gases 162 through the core turbine engine 106.

During operation of the gas turbine engine 100, various turbomachinery components (e.g., compressor blades 140, 142, turbine blades 166, 170, compressor stator vanes 138, 141, turbine stator vanes 164, 168, fan blades 136, etc.) are subjected to extreme pressures and temperatures, causing deterioration of the turbomachinery components over time. Moreover, the turbomachinery components can further be degraded or worn by foreign object debris (FOD). For example, the fan blades 136 are particularly vulnerable to FOD as the fan 134 is positioned at the inlet 156 of the gas turbine engine 100. In some instances, damaged or deteriorated engine blades are removed from the gas turbine engine 100 and are subjected to a blade regeneration process.

Figure 2:
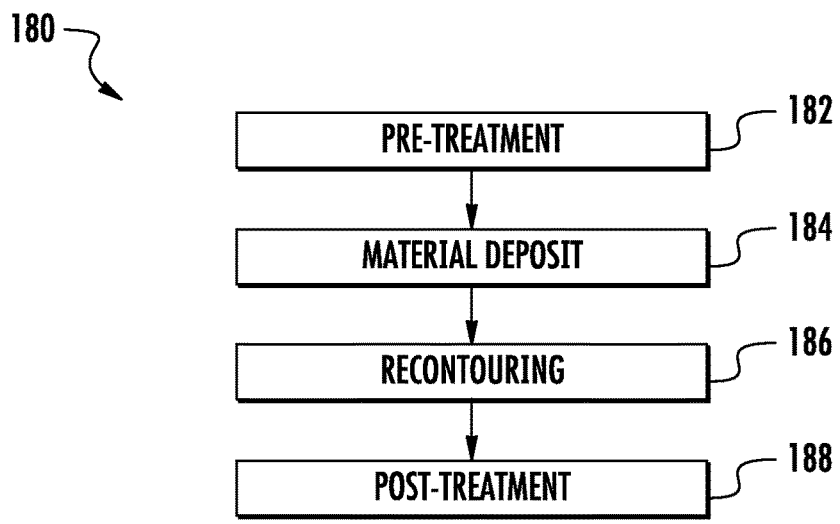
FIG. 2 provides a flow chart of an exemplary blade regeneration process according to an exemplary embodiment of the present disclosure.

FIG. 2 provides a flow chart of an exemplary blade regeneration process 180 according to an exemplary embodiment of the present disclosure. For this exemplary embodiment, the blade regeneration process 180 includes a pre-treatment process 182, a material deposit process 184, a recontouring process 186, and a post-treatment process 188. More specifically, after an engine blade is removed from an engine for servicing, the blade undergoes one or more pre-treatment processes 182 that sufficiently prepare the engine blade for the material deposit process 184. For example, the worn or deteriorated portion of the engine blade can be removed. During the material deposit process 184, material is cladded, deposited, or otherwise added to the existing blade. The excess material is then removed by a material removal tool during the recontouring process 186 such that the engine blade is reshaped to specification. Thereafter, the engine blade undergoes one or more post-treatment processes (e.g., one or more coatings can be applied to the blade). The present disclosure primarily concerns the recontouring process 186.

Figure 3:
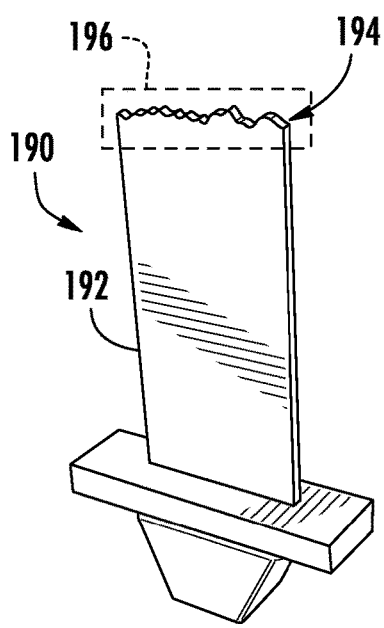
FIG. 3 provides an exemplary engine blade in a damaged condition according to an exemplary embodiment of the present disclosure.
Figure 4:
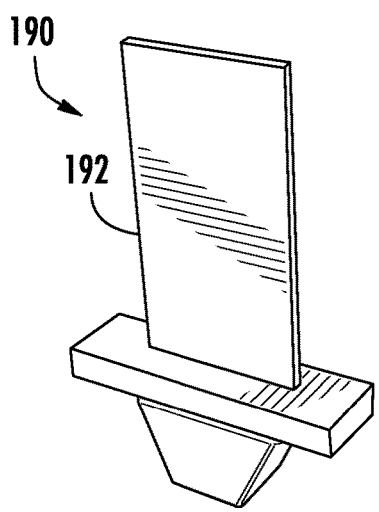
FIG. 4 provides the engine blade of FIG. 3 with the damaged portion removed.
Figure 5:
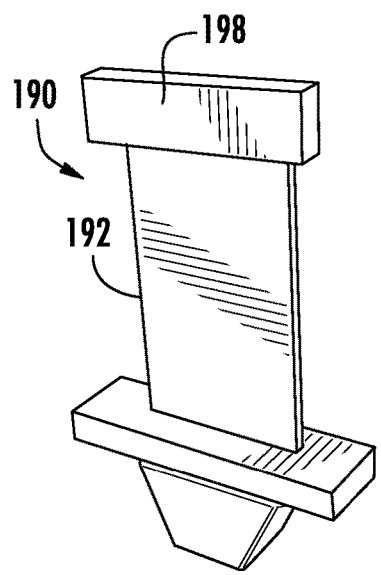
FIG. 5 provides the engine blade of FIG. 3 having a block of material deposited thereon.

With reference to FIGS. 3 through 5, FIG. 3 depicts an exemplary engine component 190 in a damaged condition, and more particularly, a damaged engine blade 192. For instance, the damaged engine blade 192 can be a compressor or turbine blade. FIG. 4 provides the engine component 190 of FIG. 3 with the damaged portion removed. FIG. 5 provides the engine component 190 of FIG. 3 having a block of material deposited thereon.

As shown in FIG. 3, the engine blade 192 has experienced significant deterioration, and more particularly, the engine blade 192 has experienced significant abrasion or wear along a blade tip 194 of the engine blade 192. Engine blades can experience a wide variety of damage types or failures, including microstructural change, oxidation, cracks, abrasion, deformation, and entire breakages. Such deterioration negatively affects engine performance.

As shown in FIG. 4, during the pre-treatment process 182 a deteriorated portion 196 (FIG. 3) of the engine blade 192 is removed. Thereafter, as shown in FIG. 5, material is cladded or otherwise added to the existing engine blade 192. During the material deposit process 184, in some exemplary embodiments, the deposited material 198 can be welded to the existing engine blade 192. For the illustrated embodiment of FIG. 5, the deposited material 198 is a cuboid-shaped metallic material welded to the engine blade 192. The deposited material 198 can be any suitable material, including but not limited to a nickel-based super alloy, ceramic materials, ceramic matrix composite materials (CMCs), etc. Once the deposited material 198 has been welded to or otherwise added to the engine blade 192, the engine blade 192 is recontoured in accordance with desired specifications.

Figure 6:
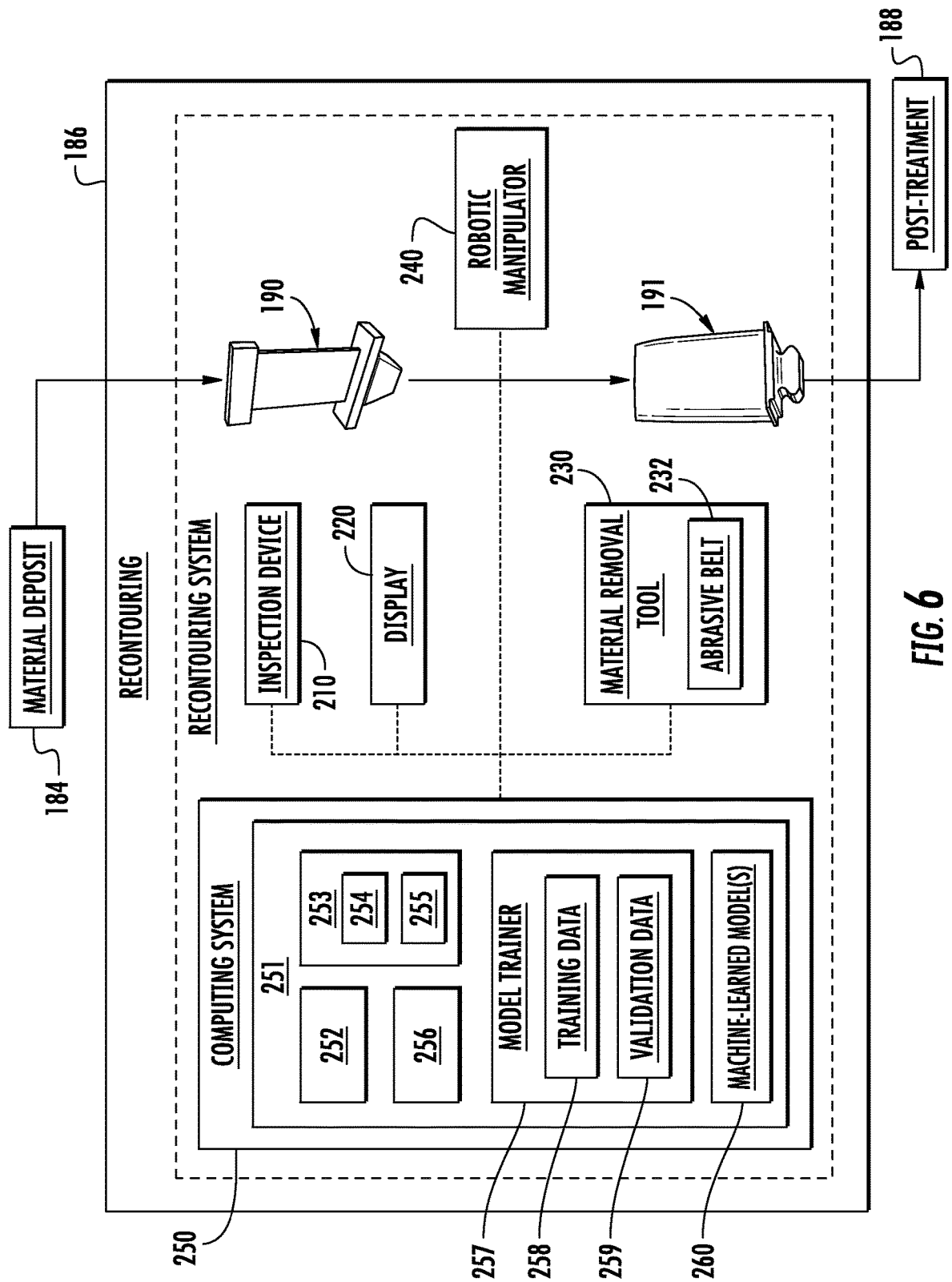
FIG. 6 provides a schematic view of an exemplary robotic system operatively configured to recontour engine components according to an exemplary embodiment of the present disclosure.

FIG. 6 provides a schematic view of an exemplary recontouring system 200 operatively configured to recontour an engine component 190 according to an exemplary embodiment of the present disclosure. In this exemplary embodiment, the engine component 190 is a turbine blade of a gas turbine engine, such as one of the HP turbine blades 166 of the gas turbine engine of FIG. 1. As depicted in FIG. 6, after the material deposit process 184, the engine component 190 having a block of material deposited thereon proceeds to the recontouring system 200 where the engine component 190 undergoes the recontouring process 186. After being recontoured, the processed engine component 191 proceeds to the post-treatment process 188 as shown in FIG. 6. For this exemplary embodiment, the recontouring system 200 includes an inspection device 210, a display device 220, a material removal tool 230, a robotic manipulator 240, and a computing system 250. Each will be discussed in turn.

The inspection device 210 is operatively configured to scan an incoming engine component 190 such that features or parameters of the component can be resolved or extracted. For example, the inspection device 210 can sense the current condition of particular sections of the engine component 190 (e.g., the amount of deterioration of the component, the amount of material deposited thereon, etc.). More particularly, the inspection device 210 can sense the angular deviation of the engine component 190 with respect to a reference datum plane, the positioning of the block of material deposited on the existing engine blade, as well as other parameters that describe a current condition of the engine component 190 or a particular section of the component. Moreover, the inspection device 210 is operatively configured to sense or measure one or more parameters indication of the condition of the recontouring system 200, such as e.g., how much the material removal tool 230 is worn or the overall uncertainties in the system.

The inspection device 210 can be any suitable device. For instance, the inspection device 210 can be a laser-based 2D or 3D scanner. As another example, the inspection device 210 can be an optical-tracking 3D scanning device that may capture the details, features, or parameters of the incoming engine component 190. As another example, the inspection device 210 can be a 2D laser-based lines scanner configured to capture the profile parameters of each section of the component. Other suitable inspection devices are contemplated. In certain exemplary embodiments, the inspection device 210 can pivot about the incoming engine component 190 such that a scan of the component can more easily be obtained. For example, inspection device 210 can be operatively connected with a robotic arm of robotic manipulator 240 that is movable through 6 degrees of freedom. In this way, the inspection device 210 can capture the profile parameters of the component from various angles and perspectives.

The display device 220 is operatively configured to display information to a user regarding the operation and status of the recontouring system 200. The display device 220 can include one or more user input devices for manipulating the recontouring system 200. Such user input devices can include one or more of a variety of electrical, mechanical, or electro-mechanical input devices including rotary dials, push buttons, touch pads, and touch screens. In some exemplary embodiments, the display device 220 can include or represent a general purpose I/O ("GPIO") device or functional block. The display device 220 can be any suitable display device.

The material removal tool 230 is operatively configured to remove a portion of the deposited material 198 from the engine component 190 such that the engine component 190 can be shaped or recontoured to specification. The material removal tool 230 can be any suitable tool. For instance, for the illustrated embodiment of FIG. 6, the material removal tool 230 is a belt grinder having an abrasive belt 232 operatively configured to grind or sand a portion of the deposited material 198 from the engine component 190. In yet other exemplary embodiments, the material removal tool 230 can be a grinding wheel, an endmill, a polishing disc, a cutter or cutting tool, or any other suitable abrasive tool. In yet other exemplary embodiments, the material removal tool 230 can be a tool capable of removing material from a workpiece without the tool physically contacting the workpiece, such as e.g., electrical discharge machining, electrochemical grinding, electrochemical machining, etc. The material removal tool path of the material removal tool 230 can be adjusted in accordance with one or more machine offsets as will be described in greater detail herein.

The robotic manipulator 240 is operatively configured to hold the engine components 190 and cycle them through the recontouring system 200. For example, the robotic manipulator 240 can be a robotic arm configured to hold or rotate the engine component 190 through six DOF. The robotic manipulator 240 can cycle the engine component 190 from the inspection device 210 to the material removal tool 230. In some exemplary embodiments, the robotic manipulator 240 can adjust the orientation or position of the engine component 190 during machining such that the material removal tool path can be adjusted without adjusting the material removal tool 230.

As further shown in FIG. 6, the recontouring system 200 further includes computing system 250. Computing system 250 is operatively configured to control various aspects of the recontouring system 200, such as e.g., the robotic manipulator 240, the inspection device 210, the display device 220, the material removal tool 230, including the abrasive belt 232. As shown by the dashed lines in FIG. 6, the computing system 250, and more particularly the devices of the computing system 250, are communicatively coupled with the inspection device 210, the display device 220, the robotic manipulator 240, and the material removal tool 230. The devices of the computing system 250 can be communicatively coupled with the various components of the recontouring system 200 in any suitable manner, such as e.g., by one or more wired or wireless connections.

For this exemplary embodiment, the computing system 250 of the recontouring system 200 includes one or more computing device(s) 251. The computing device(s) 251 can include one or more processor(s) 252 and one or more memory device(s) 253. The one or more processor(s) 252 can include any suitable processing device, such as a microprocessor, microcontroller, integrated circuit, logic device, and/or other suitable processing device. The one or more memory device(s) 253 can include one or more computer-readable media, including, but not limited to, non-transitory computer-readable media, RAM, ROM, hard drives, flash drives, and/or other memory devices.

The one or more memory device(s) 253 can store information accessible by the one or more processor(s) 252, including computer-readable instructions 254 that can be executed by the one or more processor(s) 252. The instructions 254 can be any set of instructions that when executed by the one or more processor(s) 252, cause the one or more processor(s) 252 to perform operations. In some embodiments, the instructions 254 can be executed by the one or more processor(s) 252 to cause the one or more processor(s) 252 to perform operations, such as any of the operations and functions for which the computing device(s) 251 are configured. The instructions 254 can be software written in any suitable programming language or can be implemented in hardware. Additionally, and/or alternatively, the instructions 254 can be executed in logically and/or virtually separate threads on processor(s) 252.

The memory device(s) 253 can further store data 255 that can be accessed by the one or more processor(s) 252. For example, the data 255 can include parameters or features descriptive of the condition of all of the incoming engine components 190. For example, the parameters or features can be descriptive of the engine component's condition with respect to deformation, the amount, position, and orientation of the material added during the material deposit process 184, but also to other factors like thickness of the abrasive belt 232 used for grinding and sanding and the amount of material that is removed from each engine component 190 during the recontouring process 186, which is typically determined in a post-inspection process.

The computing device(s) 251 can also include a communication interface 256 used to communicate, for example, with the other components of the recontouring system 200 over other components over a network. The communication interface 256 can include any suitable components for interfacing with one or more network(s), including for example, transmitters, receivers, ports, controllers, antennas, and/or other suitable components. The network can be any type of communications network, such as a local area network (e.g., intranet), wide area network (e.g., Internet), or some combination thereof and can include any number of wired or wireless links. In general, communication interface 256 can communicate over networks via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

As further shown in FIG. 6, one or more computing devices 251 of the computing system 250 can store or otherwise include one or more machine-learned models 260 or a cluster of machine-learned models. For example, the models 260 can be or can otherwise include various machine-learned models such as neural networks (e.g., deep neural networks) or other multi-layer non-linear models. In some exemplary embodiments, the machine-learned model 260 can be operatively configured to output a machine offset that can be used for recontouring the engine component 190.

In some various embodiments, the machine-learned model 260 is a machine or statistical learning model structured as one of a linear discriminant analysis model, a partial least squares discriminant analysis model, a support vector machine model, a random tree model, a logistic regression model, a naive Bayes model, a K-nearest neighbor model, a quadratic discriminant analysis model, an anomaly detection model, a boosted and bagged decision tree model, an artificial neural network model, a C4.5 model, a k-means model, or a combination of one or more of the foregoing.

Referring still to FIG. 6, as shown, at least one of the computing devices 251 of computing system 250 includes a model trainer 257 that is operatively configured to train one or more of the machine-learned models 260 using various training or learning techniques. For example, where the machine learned-model 260 is a neural network, such training or learning techniques can include, for example, backwards propagation of errors. In some embodiments, performing backwards propagation of errors can include performing truncated backpropagation through time. The model trainer 257 can perform any number of generalization techniques (e.g., weight decays, dropouts, etc.) to improve the generalization capability of the models 260 being trained.

The model trainer 257 can train one or more of the models 260 based on a set of training data 258. The training data 258 can include, for example, parameters or features indicative of a condition of a particular engine component after being removed from an engine and undergoing the material deposit process 184 as well as information about the material removal tool (e.g., the belt thickness at the time of material removal) and information about the recontouring system 200 overall. The training data 258 can further include the machine offsets used to recontour the engine component to desired specification. With known inputs (i.e., the condition of the incoming engine component, the belt thickness, and the behavior of the recontouring system 200) and corresponding outputs (the machine offset used to machine the engine component to specifications), the model 260 can be trained.

Once the model trainer 257 has been trained the models 260 using the training data 258, test or validation data 259 can be used to test or validate the models 260. The test or validation data 259 can be made up by data indicative of parameters or features descriptive of a condition of a particular engine component after being removed from an engine and undergoing the material deposit process 184 as well as information about the material removal tool (e.g., the belt thickness at the time of material removal) and information about the recontouring system 200 overall. The validation data 259 includes new inputs and corresponding outputs that are used to validate the models 260. Once the machine-learned models 260 are trained and validated, the models 260 can be used to output machine offsets such that the material removal tool path of the material removal tool 230 can be adjusted automatically. In this way, the engine components 190 cycling through the recontouring system 200 can be recontoured to specification.

Figure 7:
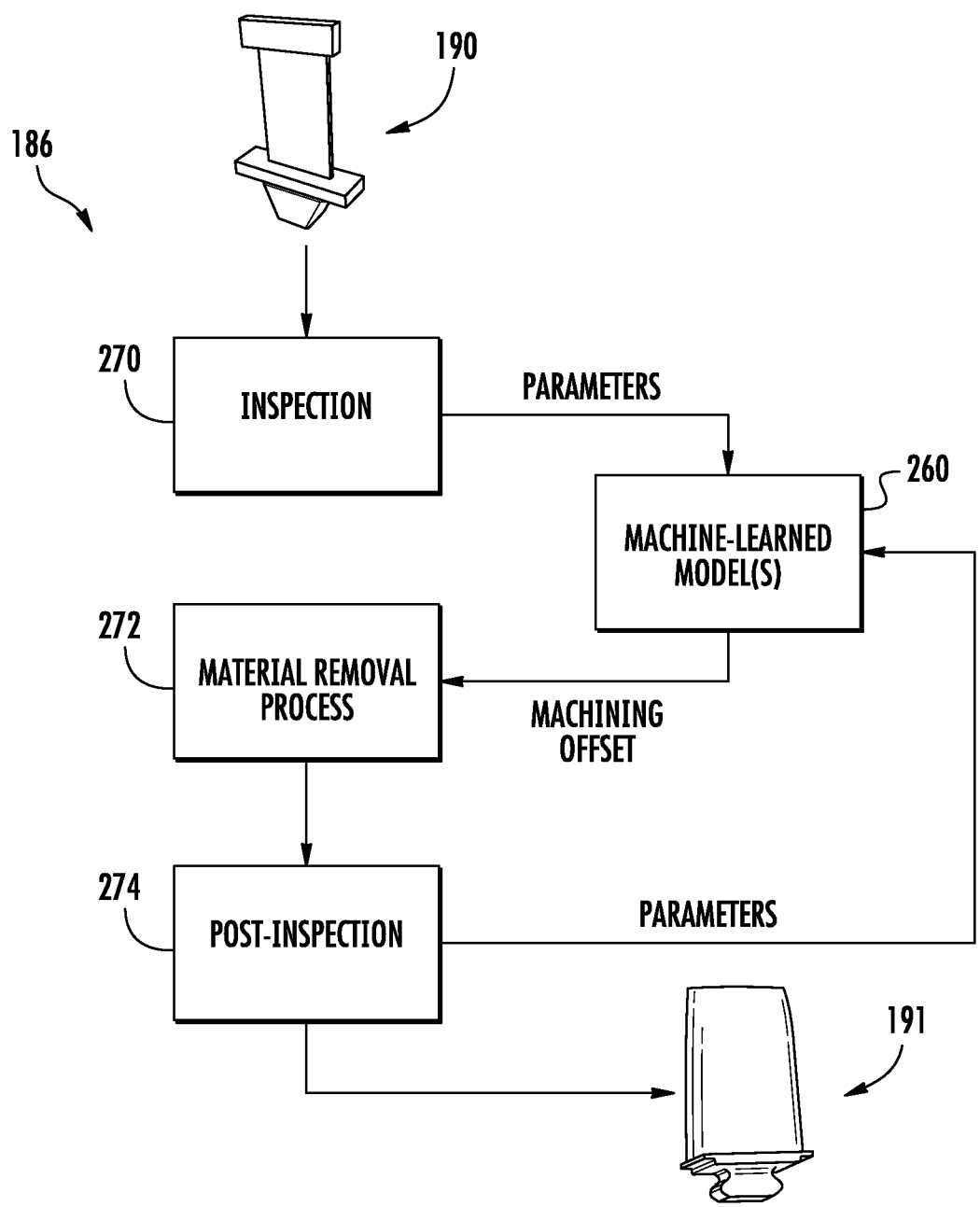
FIG. 7 provides a flow diagram of an exemplary recontouring process according to an exemplary embodiment of the present disclosure.

FIG. 7 provides an exemplary recontouring process 186 according to an exemplary embodiment of the present disclosure. Generally, the exemplary recontouring process 186 includes an inspection process 270, a material removal process 272, and a post-inspection process 274. As shown in FIG. 7, various parameters P are extracted or otherwise obtained during the inspection process 270. In particular, various parameters P descriptive or indicative of a condition of one of the sections of the engine component 190 are extracted or otherwise obtained, and in some embodiments, parameters indicative of a condition of the recontouring system 200 are extracted or otherwise obtained, such as e.g., a condition of the thickness of the abrasive belt 232. After parameters P associated with each section of the engine component 190 and parameters P associated with the condition of the recontouring system 200 are obtained, the parameters P are input into a machined-learned model 260, such as e.g., a cluster of deep neural networks. In particular, the parameters P associated with a particular section of the engine component 190 and the condition of the recontouring system 200 are grouped as subsets, and each subset is input into a corresponding machine-learned model. As an output of each of the machine-learned models, a section machine offset is received or otherwise obtained. Based at least in part on the machine offsets, a material removal tool path is adjusted such that the engine component 190 is recontoured in accordance with desired specifications. The engine component 190 then undergoes the post-inspection process 274 in which the engine component 190 is checked for accuracy. Based on the accuracy of the processed engine component 191, the current behavior or condition of the recontouring system 200 can be determined. The material removal tool path can be adjusted for subsequent engine components cycled through the recontouring system 200 based at least in part on the behavior or condition of the recontouring system 200.

Figure 8:
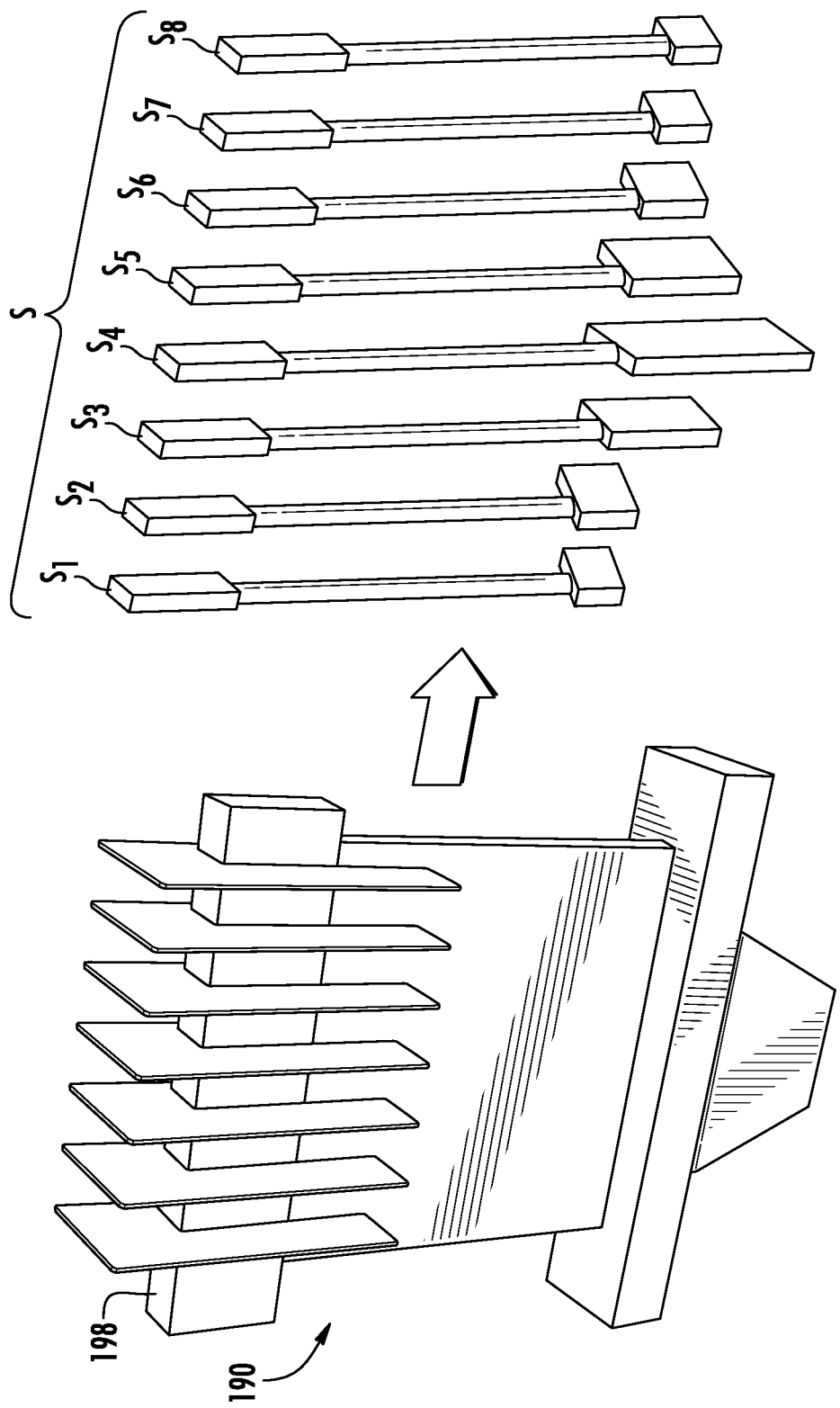
FIG. 8 provides a schematic representation of the engine component of FIG. 7 segmented into one or more sections according to an exemplary embodiment of the present disclosure.

As noted above, the parameters P obtained during the inspection process 270 can be descriptive or indicative of a condition of one of the sections of the engine component 190. The engine component can be segmented into various sections. FIG. 8 provides the engine component 190 of FIG. 7 segmented into one or more sections S. For this exemplary embodiment, the engine component 190 is segmented into eight (8) sections. In alternative exemplary embodiments, the engine component 190 can be segmented into any suitable number of sections, such as e.g., ten (10) sections, one hundred sections (100), or one thousand (1,000) sections. As will be explained more fully below, by segmenting the engine component 190 into sections S, the part-to-part variation in deterioration, the complexity of the blade geometry, the uncertainty in the positioning, size, and orientation of the deposited material 198, the material removal tool thickness or wear, and the uncertainty of the recontouring system can be broken down into a group of more manageable sub-problems. In this way, the trained machine-learned models can output more accurate machine offsets that can be used to adjust the material removal tool path of the material removal tool 240.

Returning to FIG. 7, each process of the exemplary recontouring process 186 will now be described in further detail. As noted above, during the inspection process 270, various parameters P are extracted or otherwise obtained. For instance, the parameters P can be indicative of the engine component's condition with respect to deformation, the amount, position, and orientation of the deposited material 198 added during the material deposit process 184 (FIG. 3). Additionally, other parameters P indicative of the condition of the recontouring system 200 can be received or otherwise obtained. For instance, the parameters P can include the thickness of the abrasive belt 232 used for grinding and sanding and the amount of material that is actually removed from each engine component 190 during the recontouring process 186, which is typically determined in the post-inspection process 274.

Figure 9:
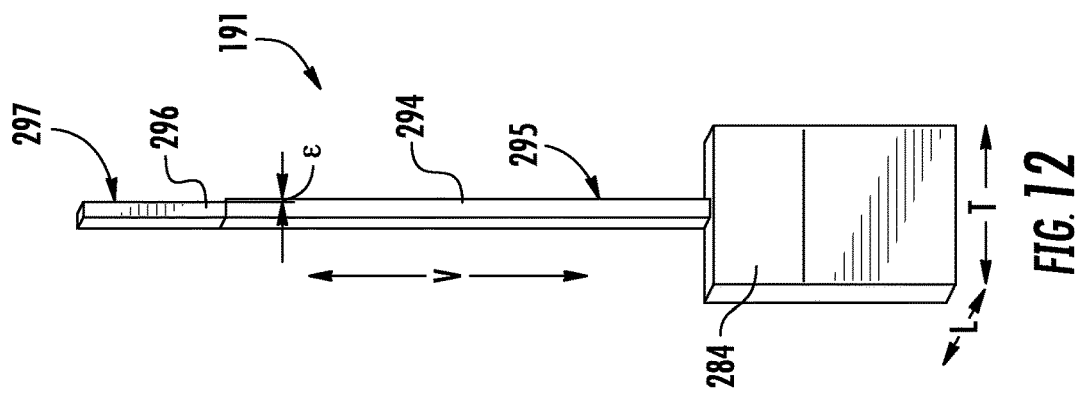
FIG. 9 provides a side, perspective view of an exemplary engine component depicting an exemplary technique for determining an angular deviation parameter according to an exemplary embodiment of the present disclosure.

FIG. 9 provides a side, perspective view of engine component 190 depicting an exemplary technique for determining an angular deviation parameter φ according to an exemplary embodiment of the present disclosure. As noted above, one exemplary parameter that can be obtained during the inspection process 270 is the angular deviation φ of the engine component 190 with respect to a reference datum plane DP. As shown in FIG. 9, the engine component 190 defines a direction V, a lateral direction L, and a transverse direction T. Each of the vertical direction V, lateral direction L, and transverse direction T are mutually perpendicular to one another and form an orthogonal direction system.

For this embodiment, the angular deviation φ represents the section bend with respect to the reference datum plane DP extending in a plane along the vertical and lateral directions V, L. More particularly, for this embodiment, the reference datum plane DP extends in a plane extending along the vertical and lateral directions V, L coplanar with a plane extending where a leading edge 282 of an airfoil 280 of the engine component 190 connects with a blade platform 284 of the engine component 190. It will be appreciated that the reference datum plane DP may be a plane extending from other suitable locations along the transverse direction T.

Each section S of the engine component 190 can be altered in many different ways over its service life, which can greatly affect the recontouring result. In particular, the engine component 190 can be deformed or bent out of shape during operation of the gas turbine engine. Thus, the angular deviation φ is measured and forwarded to the machine-learned model 260 as an input parameter. In this way, the system can adapt or adjust the material removal tool path based at least in part on this parameter.

Figure 10:
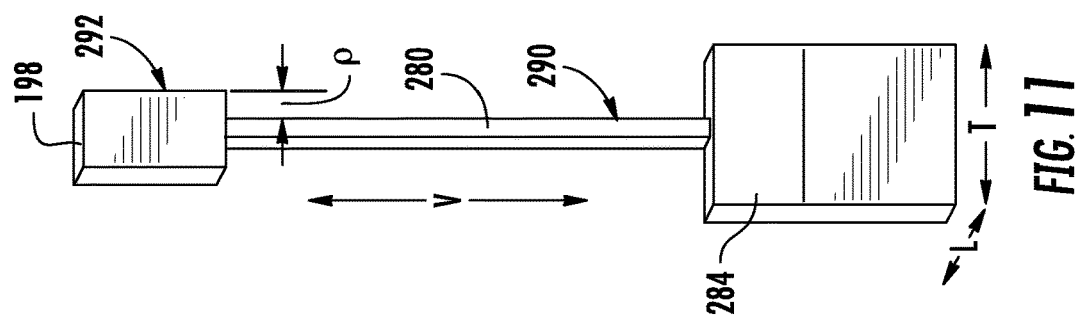
FIG. 10 provides a side, perspective view of an exemplary engine component depicting an exemplary technique for determining a step position parameter according to an exemplary embodiment of the present disclosure.

FIG. 10 provides a side, perspective view of exemplary engine component 190 depicting an exemplary technique for determining a step position parameter δ according to an exemplary embodiment of the present disclosure. One exemplary parameter that can be obtained during the inspection process 270 is the step position δ of the engine component 190. As shown in FIG. 10, for this embodiment, the step position δ is measured as a distance between a top 286 of the deposited material 198 to a bottom 288 of the deposited material 198 along the vertical direction V. The step position δ (i.e., the vertical length of the deposited material) may vary from section-to-section and from part-to-part. These variations can affect the recontouring result. The step position δ of the deposited material 198 may vary from part-to-part and section-to-section due to the impreciseness of the material deposit process 184 (e.g., a welding process). Thus, the step position δ of the deposited material 198 is measured and forwarded to the machine-learned model 260 as an input parameter. In this way, the system can adapt or adjust the material removal tool path based at least in part on this parameter.

Figure 11:
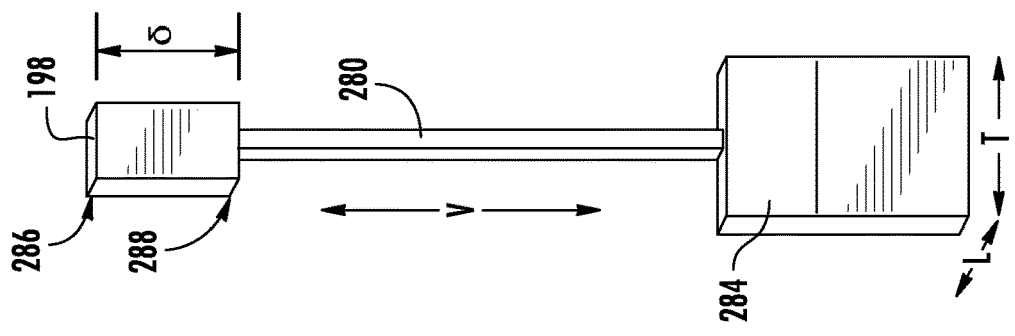
FIG. 11 provides a side, perspective view of an exemplary engine component depicting an exemplary technique for determining a tool state parameter according to an exemplary embodiment of the present disclosure.

FIG. 11 provides a side, perspective view of exemplary engine component 190 depicting an exemplary technique for determining a tool state parameter ρ according to an exemplary embodiment of the present disclosure. One exemplary parameter that can be obtained during the inspection process 270 is the tool state parameter ρ. The tool state ρ is a parameter indicative of a condition of the material removal tool 230. For instance, where the material removal tool 230 is abrasive belt 232, the condition of the material removal tool 230 can be descriptive of a thickness of the abrasive belt 232.

For this exemplary embodiment, to determine the tool state ρ, the material removal tool 230 performs a blind pass on the deposited material 198. Stated differently, the material removal tool 230 machines the engine component 190 with a degree of margin from the desired shape. The newly exposed surface of the engine component 190 can then be used as a reference for determining the characteristics or behavior of the abrasive belt 232. Next, as shown in FIG. 11, the tool state parameter ρ is measured along the engine component 190 for each section S as a distance between an edge 290 of the airfoil 280 of the engine component 190 to an edge 292 of the deposited material 198 along the transverse direction T. More particularly, for this embodiment, the tool state parameter ρ is measured along the engine component 190 for each section S as a distance between an edge 290 of the airfoil 280, which in this embodiment is a trailing edge of the airfoil 280, to an edge 292 of the deposited material 198, which in this embodiment is the trailing edge of the deposited material, along the transverse direction T. Since this blind pass is performed with constant parameters, the resulting measurement varies as a function of the belt thickness. The tool state parameter ρ may vary from section-to-section and from part-to-part. These variations can affect the recontouring result. Thus, the tool state parameter ρ is measured during the inspection process 270 and forwarded to the machine-learned model 260 as an input parameter. In this way, the system can adapt or adjust the material removal tool path based at least in part on this parameter.

In alternative exemplary embodiments, the tool state parameter ρ can be determined by other suitable techniques. For instance, the tool state parameter ρ can be determined by one or more sensors of the recontouring system 200. The one or more sensors of the recontouring system 200 can acquire 3D scans of the material removal tool 230. For example, where the material removal tool 230 is an abrasive belt 232, the thickness of the belt can be scanned such that the thickness of the belt is known. The 3D scans can then be sent to one or more computing devices 251 of the computing system 250 for processing. The parameters or characteristics of the material removal tool 230 can be forwarded to the machine-learned model 260 such that the system can account for the variation in the material removal tool 230 over time. As will be appreciated, continuing with the example above, the abrasive belt 232 will have a particular thickness when machining a first component cycled through the recontouring system 200 and will have a different thickness when machining the one hundredth component cycled through the recontouring system 200. That is, the abrasive belt 232 will have a larger thickness when machining the first component than when machining the one hundredth component. Other material removal tools, such as e.g., a cutter, can also have tool wear over time as well. The tool state parameter ρ takes the tool wear of the material removal tool 230 into account such that engine components can be more accurately recontoured.

Figure 12:
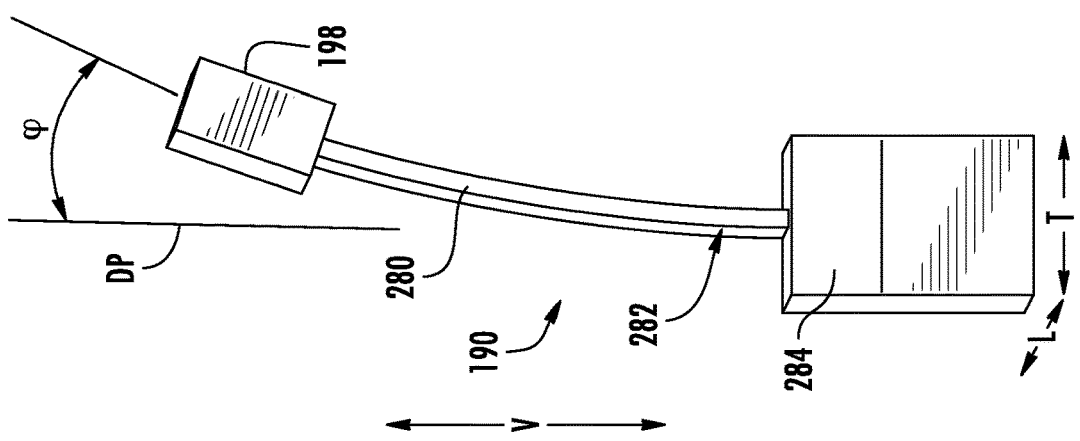
FIG. 12 provides a side, perspective view of an exemplary engine component depicting an exemplary technique for determining a measured step parameter according to an exemplary embodiment of the present disclosure.

FIG. 12 provides a side, perspective view of processed engine component 191 depicting an exemplary technique for determining a measured step parameter ε according to an exemplary embodiment of the present disclosure. One exemplary parameter that can be obtained during the post-inspection process 274 (i.e., after the material removal process 272) is the measured step parameter ε of the processed engine component 191. The measured step parameter ε provides information regarding the condition of the recontouring system 200. Stated differently, the measured step parameter ε relates the incoming condition of the engine component 190 (i.e., the angular deviation φ and the step position δ) and the tool state ρ with the actual material removed during the material removal process 272. In this way, the measured step parameter ε accounts for uncertainties in the recontouring system 200 and can make adjustments to the material removal tool path for subsequent engine components cycled through the recontouring system 200 to account for these uncertainties.

As shown in FIG. 12, for this exemplary embodiment, the measured step parameter ε is measured along the recontoured engine component 191 for each section S as a distance between an edge 295 of a non-regenerated portion 294 of the processed engine component 191 (i.e., the existing portion of the processed engine component 191), to an edge 297 of the regenerated portion 296 (i.e., the deposited material 198 of the processed engine component 191) along the transverse direction T. Notably, this measurement is taken during the post-inspection process 274. As shown in FIG. 7, this parameter P can be fed back into the machine-learned model 260 such that subsequent engine components can be more accurately recontoured to specification.

When continuity between the regenerated portion 296 and the non-regenerated portion 294 has been achieved (i.e., a "flush condition" has been achieved), the system will recognize that the material removal tool path was set or adjusted accurately based on the machine offsets determined by the other parameters. In instances where the measured step ε is significant, the system will make adjustments accordingly. In this way, the measured step parameter ε acts as a "catch all" the uncertainties of the recontouring system 200. The measured step parameter ε drives down the error for subsequent engine components 190 cycled through the recontouring system 200.

Other exemplary parameters can be measured and forwarded to the machine-learned model as an input parameter in addition to the above named parameters. For example, in some embodiments, one exemplary parameter that can be measured is the twist angle or angle of twist of the engine component. The twist angle for engine or fan blades may be particular useful due to their complex geometric shapes. As another example, in some embodiments, one exemplary parameter that can be measured is the chord length of an engine or fan blade. As yet another example, in some embodiments, one exemplary parameter that can be obtained is the serial or batch number of the engine components. By obtaining the serial or batch number of the engine component, the material removal tool path can ultimately be adjusted in accordance with the notion that similar parts manufactured within the same batch or at the same manufacturing facility are more likely to have constructed in a similar manner. Moreover, as yet another example, in some embodiments, other exemplary parameters that can be obtained is the stage in which the engine blade was positioned on the engine, the service life of the engine blade (i.e., the number of hours in operation), the service life of the engine blade since the last maintenance overall, the length of the blade along the vertical direction, the standard operating pressure ratio of the engine from which the blade was removed, other dimensions of the engine component, the type of material of the blade, etc. Other exemplary parameters are possible.

Figure 13:
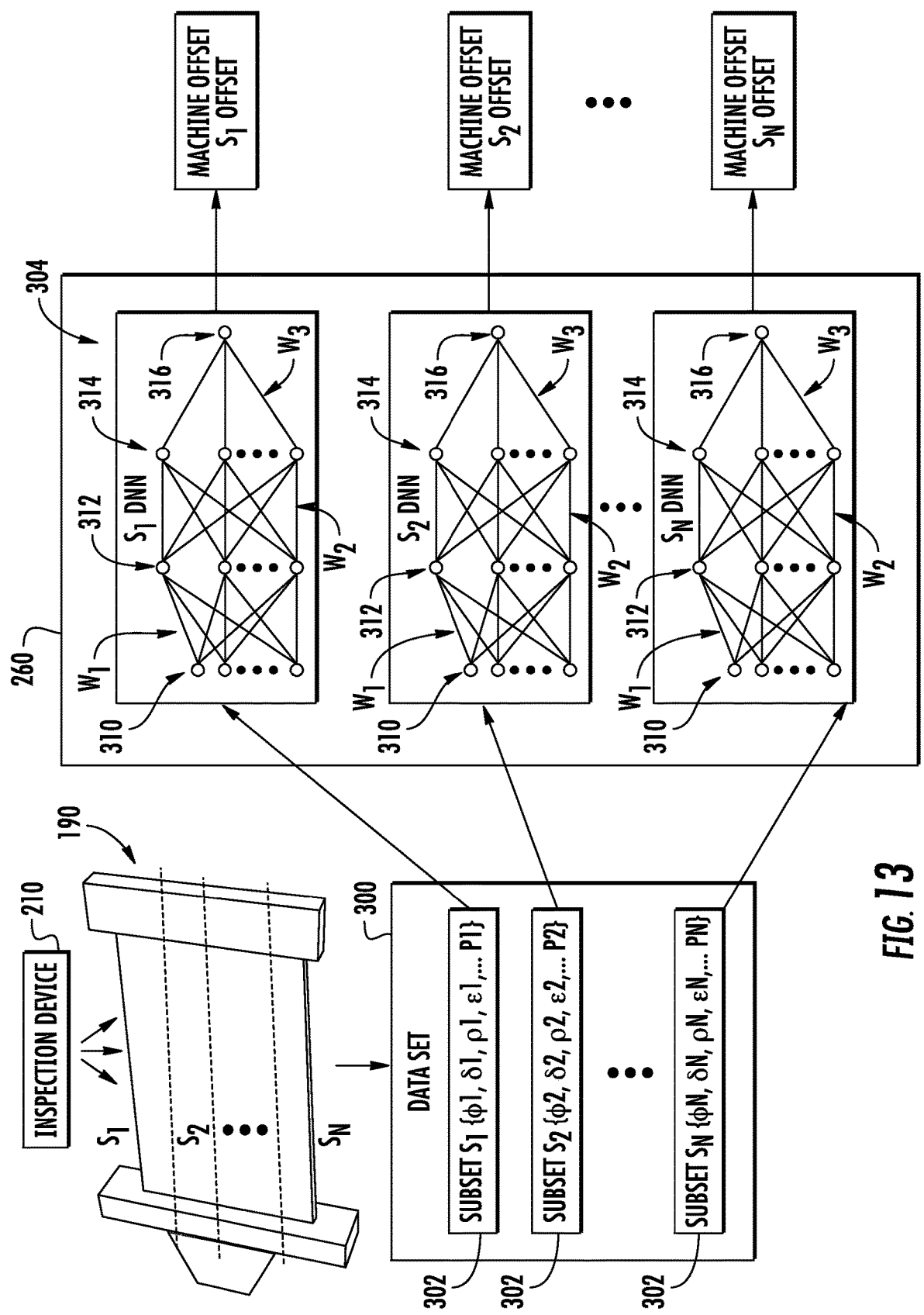
FIG. 13 provides a flow diagram for determining one or more machine offsets according to an exemplary embodiment of the present disclosure.

FIG. 13 provides a flow diagram for determining one or more machine offsets according to an exemplary embodiment of the present disclosure. After the various parameters P are measured or sensed during the inspection process 270 (or post-inspection process 274), one or more computing devices 251 of the computing system 250 receives, collects, or otherwise obtains a data set 300 made up of one or more subsets 302. As shown in FIG. 13, each section $S_1, S_2, \ldots S_N$ of the engine component 190 has a corresponding subset 302 (i.e., subset $S_1$, subset $S_2, \ldots$ subset $S_N$) that includes parameters P that are indicative of the condition that section S of the engine component 190 as well as parameters P indicative of the condition of the recontouring system 200 at the time of the material removal process 272.

For instance, for this embodiment, subset $S_1$ includes as parameters the angular deviation φ and the step position δ of the deposited material 198 that describe or indicate the condition of section $S_1$ of the engine component 190. Moreover, subset $S_1$ includes the tool state ρ of the abrasive belt 232 and the measured step ε that is indicative of the uncertainty of the recontouring system 200. The measured step ε can be a parameter measured in the post-inspection process 274 of the previous processed component, for example. Further, subset $S_1$ can include other parameters P1, such as e.g., twist angle, total blade length, batch number, etc. Likewise, for this embodiment, subset $S_2$ includes as parameters the angular deviation φ and the step position δ that are indicative of the condition of section $S_2$ of the engine component 190. Subset $S_2$ also includes the tool state ρ of the abrasive belt 232 and the measured step ε. Additionally, subset $S_2$ can include other parameters P2. Each section S of the engine component 190 can have a corresponding subset 302. For instance, section $S_N$ has a corresponding subset $S_N$.

The data set 300 is input into a machine-learned model 260, which for this embodiment is a cluster of Deep Neural Networks (DNNs) 304. As shown in FIG. 13, each subset 302 is input into a corresponding DNN. For instance, subset $S_1$ of data set 300 is input into $S_1$ DNN, subset $S_2$ is input into $S_2$ DNN, and so on and so forth for each section S of the engine component 190. For instance, as shown in FIG. 13, subset $S_N$ is input into $S_N$ DNN. The machined-learned model 260 can include any suitable number of DNNs 304 such that each subset 302 of the data set 300 has a corresponding DNN.

As further shown in FIG. 13, for this embodiment, each DNN contains an input layer, hidden layers, and an output layer. The input layer 310 of each DNN can include any suitable number of nodes or neurons. In particular, depending on the number of parameters of each subset 302, the input layer 310 can contain a corresponding number of neurons. For instance, one neuron of the input layer 310 can be for the angular deviation parameter φ, another neuron of the input layer 310 can be for the step position parameter δ, another neuron of the input layer 310 can be for the tool state parameter ρ, another neuron of the input layer 310 can be for the measured step parameter ε, and yet another neuron of the input layer 310 can be for parameter P1 that can be indicative of a condition of one of the sections S of the engine component 190. For instance, the parameter P1 can be the twist angle of the engine component 190.

As the inputs are fed forward through their respective DNNs, a set of first weights $W_1$, each of which may be different for each synaptic connection, are applied to the input values. Then, each neuron of the first hidden layer 312 adds the outputs from its corresponding synapses between the input layer 310 and the first hidden layer 312 and applies an activation function. Thereafter, the values from the activation function are fed forward to the second hidden layer 314 where a set of second weights $W_2$, each of which may be different for each synaptic connection, is applied to the outputs of the activation functions of the first hidden layer 312. Each neuron of the second hidden layer 314 adds the outputs from its corresponding synapses between the first hidden layer 312 and the second hidden layer 314 and applies an activation function. Thereafter, the values from the activation function of the second hidden layer 314 are fed forward to the output layer 316 where a set of third weights $W_3$, each of which may be different for each synaptic connection, is applied to the outputs of the activation functions of the second hidden layer 314. In alternative exemplary embodiments, the values from the second hidden layer 314 are forwarded to a further hidden layer or layers before reaching the output layer 316. Each DNN can include any suitable number of hidden layers. The neuron of the output layer 316 receives the values from the synaptic connections and likewise applies an activation function to render an output of the network. In this example, the output of each DNN is a machine offset for a particular section S of the engine component 190. As shown particularly in FIG. 13, the output of the $S_1$ DNN is a machine offset $S_1$, the output of the $S_2$ DNN is a machine offset $S_2$, and the output of the $S_N$ DNN is a machine offset $S_N$.

Notably, due to the architecture of the machine-learned model 260, which in this embodiment is a cluster of DNNs 304 configured for parallel processing, the subsets 302 can be processed concurrently such that the machine offsets associated with each section S can be predicted in real-time to ultimately render an optimized material removal tool path. The subsets can be processed on multiple computing devices or GPUs or on a single processing unit, for example. Stated differently, the recontouring system 200 need not sequentially perform operations using an iterative, closed loop process between the material removal process and the inspection process to find the correct machine offset for each section S. Rather, for this exemplary embodiment, the recontouring system 200 performs a single computational step to obtain machine offsets for each section S of the engine component 190. In this way, the blade regeneration cycle time, and more particularly the cycle time of the recontouring process 186, can be completed more efficiently.

Figure 14:
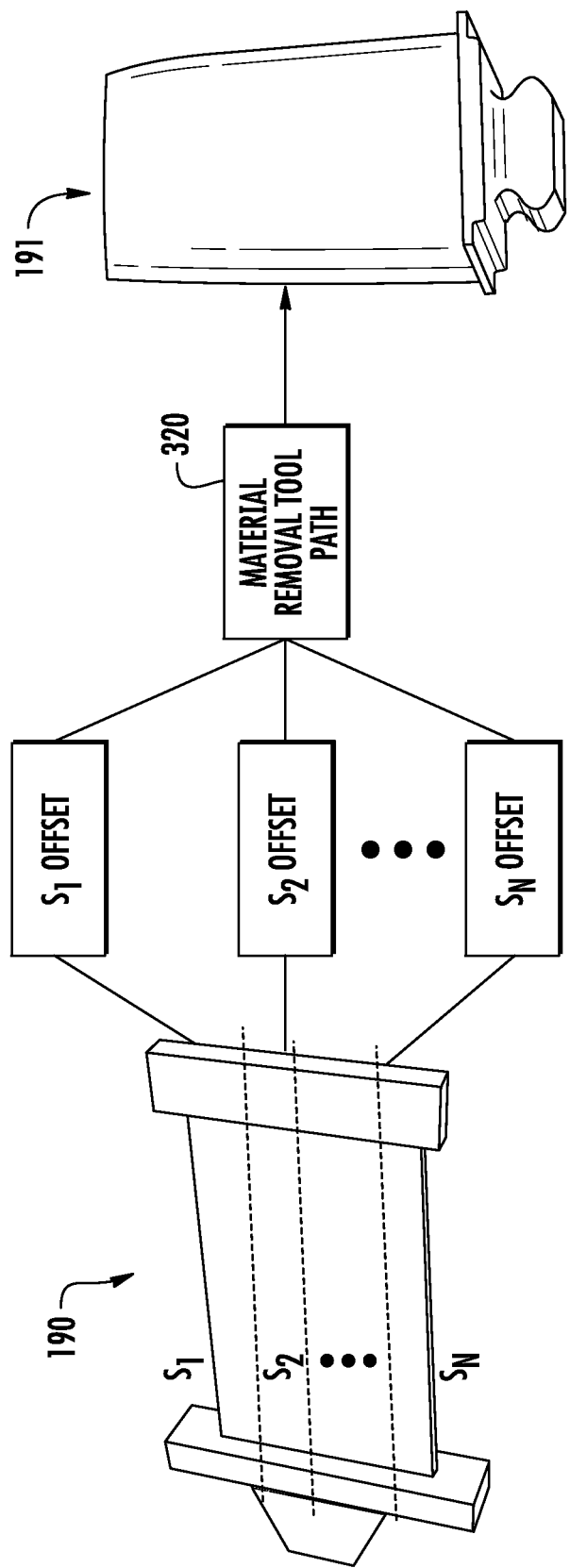
FIG. 14 provides a flow diagram for determining a tool removal path according to an exemplary embodiment of the present disclosure.

FIG. 14 provides a flow diagram for determining a material removal tool path according to an exemplary embodiment of the present disclosure. As shown, as an output of each DNN 304 (FIG. 13), each section S of the engine component 190 has an associated machine offset. For instance, for this embodiment, section $S_1$ of the engine component 190 has an associated machine offset $S_1$, section $S_2$ of the engine component 190 has an associated machine offset $S_2$, and so on such that section $S_N$ has an associated machine offset $S_N$. Each machine offset, for example, accounts for the part-to-part and section-to-section variation of each engine component 190, as well as the uncertainty of the recontouring system 200. Based on the machine offsets output from their respective DNNs 304, the material removal tool path 320 can be adjusted or set and the material removal tool 230 (FIG. 6) can machine or recontour the engine component 190 using the material removal tool path 320. In this way, the engine component 190 can be recontoured in accordance with specifications. The result of the recontouring process 186 is processed engine component 191. By using a cluster of deep neural networks 304 running in parallel, the machine offsets of each section S can be predicted in real-time such that the material removal tool path 320 can be adjusted to handle the part-to-part and section-to-section variation of the engine components 190 with accurate results. For instance, in some exemplary embodiments, accuracy up to 0.001 inches (0.03 mm) can be achieved. Furthermore, the automation of determining the machine offsets reduces the blade regeneration cycle time.

Figure 15:
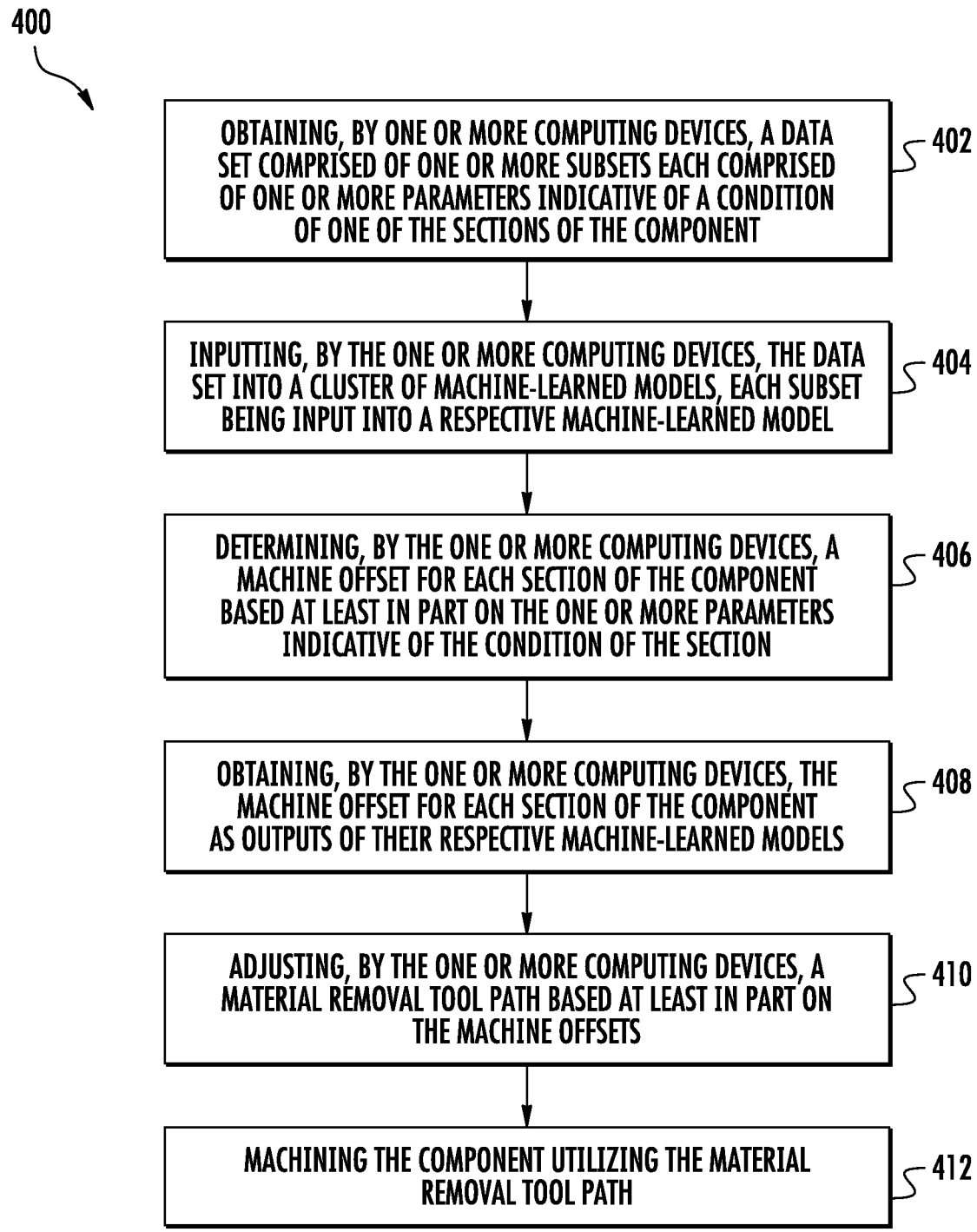
FIG. 15 provides a flow diagram of an exemplary method according to exemplary embodiments of the present disclosure.

FIG. 15 provides a flow diagram of an exemplary method (400) according to exemplary embodiments of the present disclosure. Some or all of the method (400) can be implemented by the recontouring system 200 described herein.

At (402), exemplary method (400) includes obtaining, by one or more computing devices, a data set comprised of one or more subsets each comprised of one or more parameters indicative of a condition of one of the sections of the component. For instance, one of the computing devices 251 of computing system 250 can obtain data set 300. Data set 300 can include one or more subsets 302. In some implementations, the data set 300 includes at least two subsets 302. Each subset 302 can include one or more parameters indicative of the condition of a component, such as engine component 190. In particular, exemplary parameters can include an angular deviation parameter φ, a step position parameter δ, a twist angle, a blade length, a batch or serial number of the component, etc.

At (404), exemplary method (400) includes inputting, by the one or more computing devices, the data set into a cluster of machine-learned models, each subset being input into a respective machine-learned model. For example, in some implementations, the cluster of machined-learned models can be a cluster of neural networks. In some implementations, the cluster of machined-learned models can be a cluster of deep neural networks. Each subset 302 of the data set 300 can be input into a respective machine-learned model of the cluster of models 304.

At (406), exemplary method (400) includes determining, by the one or more computing devices, a machine offset for each section of the component based at least in part on the one or more parameters indicative of the condition of the section. For instance, one or more of the computing devices 251 of the computing system 250 can determine the machine offset for each section of the component. As the parameters of each subset 302 are processed by their respective models, the trained models determine the machine offsets based on the incoming parameter values.

At (408), exemplary method (400) includes obtaining, by the one or more computing devices, the machine offset for each section of the component as outputs of their respective machine-learned models. For example, one or more of the computing devices 251 of the computing system 250 can obtain a machine offset from each of the machine-learned models of the cluster. Each machine-learned model of the cluster of machine-learned models 304 is trained to output a particular machine offset based on the parameters obtained, as noted above.

At (410), exemplary method (400) includes adjusting, by the one or more computing devices, a material removal tool path based at least in part on the machine offsets. For instance, one or more of the computing devices 251 of the computing system 250 can process the obtained machine offsets and can determine an optimized material removal tool path. In some implementations, the machine offsets can each be output as values, and based on these values, the material removal tool path can be set or adjusted. In some implementations, the machine offsets can each be output as vectors, and based on these vectors, the material removal tool path can be adjusted in magnitude and direction. In some implementations, the outputs of the respective models can be a combination of values and vectors.

At (412), exemplary method (400) includes machining the component utilizing the material removal tool path. For instance, the material removal tool can include abrasive belt. Abrasive belt, utilizing the set or adjusted material removal tool path, can machine or recontour the engine component in accordance with desired specifications.

In some implementations, the component defines a reference datum plane, and wherein the one or more parameters indicative of the condition of one of the one or more sections of the component includes an angular deviation of the component with respect to the reference datum plane.

In some implementations, the engine component defines a vertical direction. In such implementations, the method (400) further includes adding a deposited material to the component prior to obtaining the data set, and wherein the deposited material extends along the vertical direction between a top and a bottom. Moreover, in such implementations, the condition of the component includes a step position indicative of a distance between the top and the bottom of the deposited material.

In some implementations, the recontouring system is used to recontour the component. In such implementations, each subset further includes one or more parameters indicative of a condition of the recontouring system. In such implementations, during determining, the machine offset for each section of the component is based at least in part on the one or more parameters indicative of the condition of the recontouring system.

In yet some implementations, the recontouring system includes a material removal tool having an abrasive belt. In such implementations, the condition of the recontouring system includes a tool state δ indicative of a condition of the material removal tool 230.

In yet some implementations, the method (400) further includes adding a deposited material to the component prior to obtaining the data set. The method also includes machining the component utilizing the material removal tool path after adjusting the material removal tool path based at least in part on the machine offsets, and wherein after machining, the component defines a regenerated portion and a non-regenerated portion. Moreover, the method further includes performing a post-inspection process on the component. In such implementations, the one or more parameters indicative of the condition of the recontouring system includes a measured step ε, wherein the measured step ε is measured along the component for each of the sections of the component as a distance between an edge of the non-regenerated portion to an edge of the regenerated portion.

In yet some implementations, after inputting, the method (400) further includes processing, by the one or more computing devices, each subset in its respective machine-learned model in parallel.

Figure 16:
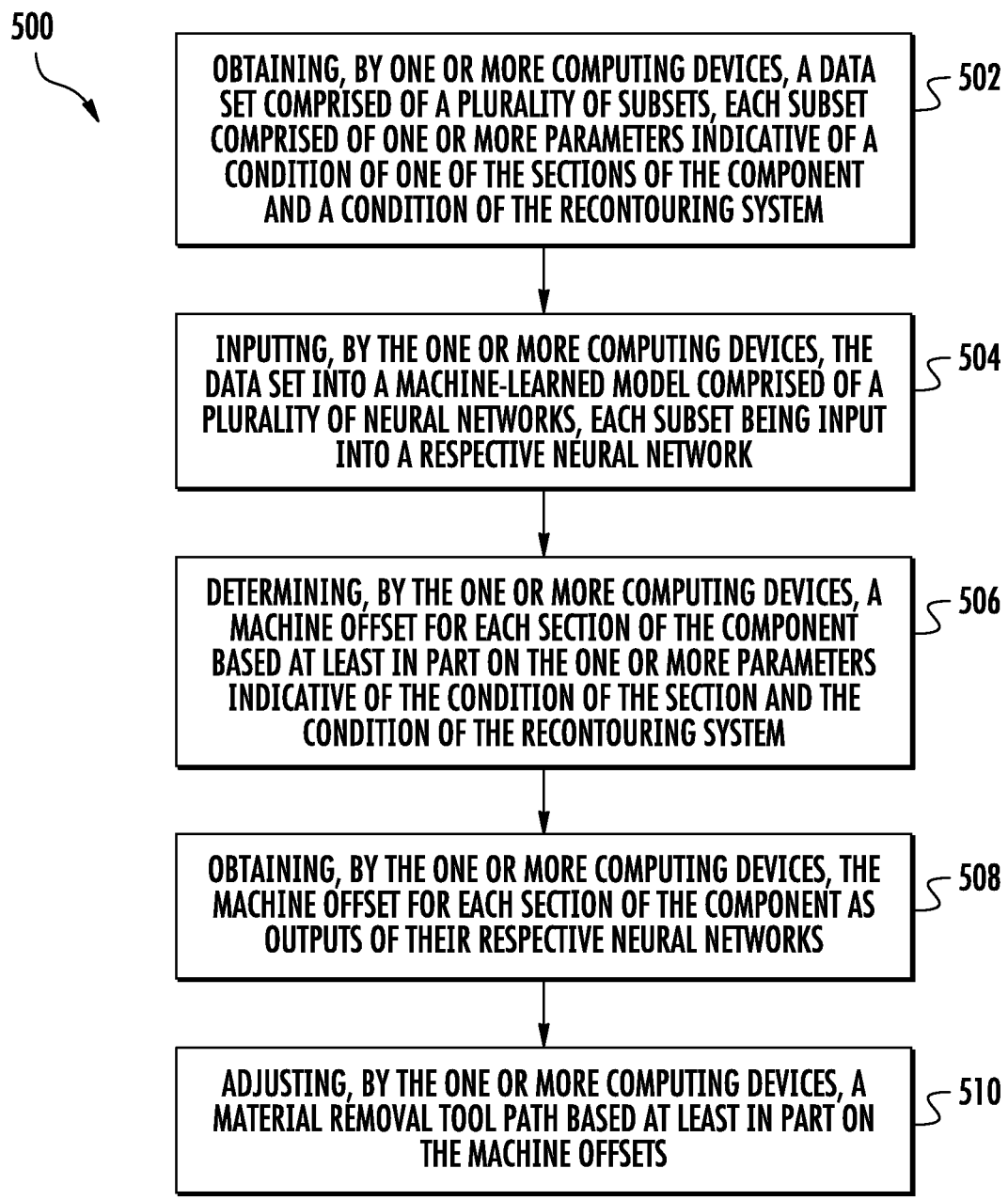
FIG. 16 provides a flow diagram of another exemplary method according to exemplary embodiments of the present disclosure.

FIG. 16 provides a flow diagram of another exemplary method (500) according to exemplary embodiments of the present disclosure. Some or all of the method (500) can be implemented by the recontouring system 200 described herein.

At (502), exemplary method (500) includes obtaining, by one or more computing devices, a data set comprised of a plurality of subsets, each subset comprised of one or more parameters indicative of a condition of one of the sections of the component and a condition of the recontouring system. For instance, one of the computing devices 251 of computing system 250 can obtain data set 300. Data set 300 can include any suitable number of subsets 302. Each subset 302 can include one or more parameters indicative of the condition of the component, such as engine component 190. In particular, exemplary parameters can include an angular deviation parameter φ, a step position parameter δ, a twist angle, a blade length, a batch or serial number of the component, etc. In addition, exemplary parameters indicative of a condition of the recontouring system can include a tool state δ indicative of a condition of the material removal tool 230 and a measured step ε indicative of the condition or uncertainty of the regeneration system.

At (504), exemplary method (500) includes inputting, by the one or more computing devices, the data set into a machine-learned model comprised of a plurality of neural networks, each subset being input into a respective neural network. For instance, each subset 302 of the data set 300 can be input into a respective DNN of the machine-learned model. In some implementations, the neural networks are deep neural networks that include at least two hidden layers.

At (506), exemplary method (500) includes determining, by the one or more computing devices, a machine offset for each section of the component based at least in part on the one or more parameters indicative of the condition of the section and the condition of the recontouring system. In such implementations, as the inputs (i.e., parameters) are fed forward through their respective networks, the weights and activation functions are applied to the value of the parameters, as a result, a machine offset is output from each of the neural networks.

At (508), exemplary method (500) includes obtaining, by the one or more computing devices, the machine offset for each section of the component as outputs of their respective neural networks. For example, one or more of the computing devices 251 of the computing system 250 can obtain a machine offset from each of the neural networks 304. Each neural network is trained to output a particular machine offset based on the parameters obtained.

At (510), exemplary method (500) includes adjusting, by the one or more computing devices, a material removal tool path based at least in part on the machine offsets. For instance, one or more of the computing devices 251 of the computing system 250 can process the obtained machine offsets and can determine an optimized material removal tool path. In some implementations, the machine offsets can each be output as values, and based on these values, the material removal tool path can be set or adjusted. In some implementations, the machine offsets can each be output as vectors, and based on these vectors, the material removal tool path can be adjusted in magnitude and direction. In some implementations, the outputs of the respective models can be a combination of values and vectors.

In some implementations, the method (500) further includes machining the component utilizing the material removal tool path.

In some implementations, the method (500) further includes adding a deposited material to the component prior to obtaining the data set. Moreover, the method further includes machining the component utilizing the material removal tool path after adjusting the material removal tool path based at least in part on the machine offsets, and wherein after machining, the component defines a regenerated portion and a non-regenerated portion. In addition, the method further includes performing a post-inspection process on the component. In such implementations, the one or more parameters indicative of the condition of the recontouring system includes a measured step, wherein the measured step is measured along the component for each of the sections of the component as a distance between an edge of the non-regenerated portion to an edge of the regenerated portion.

In some implementations, during determining the machine offset for each section of the component, the machine offsets for each section are determined in parallel. Stated differently, the parameters of each subset are processed in parallel by their respective neural networks. In some implementations, the neural networks are deep neural networks. Moreover, in some implementations, the component is at least one of an engine blade and a fan blade of the gas turbine engine.

In some implementations, the component defines a reference datum plane and a vertical direction. In addition, the recontouring system includes a material removal tool having an abrasive belt. In such implementations, the method further includes adding a deposited material to the component prior to obtaining the data set. In such implementations, the deposited material extends between top and bottom along the vertical direction. The method also includes machining the component utilizing the material removal tool path after adjusting the material removal tool path based at least in part on the machine offsets, and wherein after machining, the component defines a regenerated portion and a non-regenerated portion. The method further includes performing a post-inspection process on the component. In such implementations, the one or more parameters indicative of the condition of one of the sections of the component include: an angular deviation of the component with respect to the reference datum plane; and a step position indicative of a distance between the top and the bottom of the deposited material. Moreover, in such implementations, the one or more parameters indicative of the condition of the recontouring system include: a tool state indicative of the condition of the material removal tool (e.g., the amount of tool wear); and a measured step measured along the component for each of the sections of the component as a distance between an edge of the non-regenerated portion to an edge of the regenerated portion.

In yet further implementations, one of the parameters indicative of the condition of one of the sections of the component is a twist angle. In some implementations, the component defines a vertical direction. In such implementations, one of the parameters indicative of the condition of one of the sections of the component is a length of the component along the vertical direction.

Although the present disclosure describes the recontouring process in the context of machining or recontouring an engine component or engine blade, it will be appreciated that the teachings and inventive concepts described herein can be applied to any suitable component.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel. Such configurations can be implemented without deviating from the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for recontouring a component defining one or more sections, the method comprising:
 obtaining, by one or more computing devices, a data set comprised of a plurality of subsets each comprised of one or more parameters indicative of a condition of one of the sections of the component and one or more parameters indicative of a condition of a recontouring system;

inputting, by the one or more computing devices, the data set into a cluster of machine-learned models, each subset being input into a respective machine-learned model;

determining, by the one or more computing devices, a machine offset for each section of the component based at least in part on the one or more parameters indicative of the condition of the section and based at least in part on the one or more parameters indicative of the condition of the recontouring system;

obtaining, by the one or more computing devices, the machine offset for each section of the component as outputs of their respective machine-learned models;

adjusting, by the one or more computing devices, a material removal tool path of the recontouring system based at least in part on the machine offsets; and machining the component utilizing the material removal tool path, and wherein the one or more parameters indicative of the condition of the recontouring system include a measured step, wherein the measured step is measured during a post-inspection process of a first component defining one or more first sections, the first component being machined prior to the component by the recontouring system and defining a regenerated portion and a non-regenerated portion after being machined, the measured step being measured along the first component for each of the first sections as a distance between an edge of the non-regenerated portion to an edge of the regenerated portion.

2. The method of claim 1, wherein the component defines a reference datum plane, and wherein the one or more parameters indicative of the condition of one of the one or more sections of the component includes an angular deviation of the component with respect to the reference datum plane.

3. The method of claim 1, wherein the component defines a vertical direction, and wherein the method further comprises:
adding a deposited material to the component prior to obtaining the data set, and wherein the deposited material extends along the vertical direction between a top and a bottom;
wherein the condition of the component includes a step position indicative of a distance between the top and the bottom of the deposited material.

4. The method of claim 1, wherein the recontouring system comprises a material removal tool, and wherein the condition of the recontouring system includes a tool state indicative of a condition of the material removal tool.

5. The method of claim 1, wherein the method further comprises:
recontouring the first component machined prior to the component, the recontouring of the first component comprising:
obtaining, by the one or more computing devices, a first data set comprised of one or more first subsets each comprised of one or more first parameters indicative of a condition of one of the first sections of the first component;
inputting, by the one or more computing devices, the first data set into the cluster of machine-learned models, each first subset being input into a respective machine-learned model;
determining, by the one or more computing devices, a first machine offset for each first section of the first component based at least in part on the one or more first parameters indicative of the respective conditions of the first sections of the first component;
obtaining, by the one or more computing devices, the first machine offset for each first section of the first component as outputs of their respective machine-learned models;
adjusting, by the one or more computing devices, a first material removal tool path based at least in part on the first machine offsets; and
machining the first component utilizing the adjusted first material removal tool path;
performing the post-inspection process on the first component.

6. The method of claim 1, wherein after inputting, the method further comprises:
processing, by the one or more computing devices, each subset in its respective machine-learned model in parallel.

7. The method of claim 1, wherein the machine-learned models are neural networks.

8. A method for recontouring a component of a gas turbine engine using a recontouring system, the component defining a plurality of sections, the method comprising:
obtaining, by one or more computing devices, a data set comprised of a plurality of subsets, each subset comprised of one or more parameters indicative of a condition of one of the sections of the component and a condition of the recontouring system;
inputting, by the one or more computing devices, the data set into a machine-learned model comprised of a plurality of neural networks, each subset being input into a respective neural network;
determining, by the one or more computing devices, a machine offset for each section of the component based at least in part on the one or more parameters indicative of the condition of the section and the condition of the recontouring system;
obtaining, by the one or more computing devices, the machine offset for each section of the component as outputs of their respective neural networks;
adjusting, by the one or more computing devices, a material removal tool path of the recontouring system based at least in part on the machine offsets; and
machining the component utilizing the material removal tool path, and
wherein the parameter indicative of the condition of the recontouring system is a measured step, wherein the measured step is measured during a post-inspection process of a first component defining one or more first sections, the first component being machined prior to the component by the recontouring system and defining a regenerated portion and a non-regenerated portion after being machined, the measured step being measured along the first component for each of the first sections as a distance between an edge of the non-regenerated portion to an edge of the regenerated portion.

9. The method of claim 8, wherein the material removal tool comprises an abrasive belt, and wherein one of the one or more parameters indicative of the condition of one of the sections of the component is a tool state indicative of a condition of the material removal tool, and wherein the condition of the material removal tool is descriptive of a thickness of the abrasive belt.

10. The method of claim 8, wherein the method further comprises:
recontouring the first component machined prior to the component, the recontouring of the first component comprising:
obtaining, by the one or more computing devices, a first data set comprised of a plurality of first subsets, each first subset comprised of one or more first parameters indicative of a condition of one of the sections of the first component and a condition of the recontouring system;
inputting, by the one or more computing devices, the first data set into the machine-learned model comprised of the plurality of neural networks, each first subset being input into a respective neural network;
determining, by the one or more computing devices, a first machine offset for each first section of the first component based at least in part on the one or more first parameters indicative of the condition of the first section and the condition of the recontouring system;
obtaining, by the one or more computing devices, the first machine offset for each first section of the first component as outputs of their respective neural networks;
adjusting, by the one or more computing devices, a material removal tool path based at least in part on the first machine offsets; and
machining the first component utilizing the material removal tool path;
performing the post-inspection process on the first component.

11. The method of claim 8, wherein during determining, the machine offsets for each section are determined in parallel.

12. The method of claim 8, wherein the neural networks are deep neural networks.

13. The method of claim 8, wherein the component is at least one of an engine blade and a fan blade of the gas turbine engine.

14. The method of claim 8, wherein the component defines a reference datum plane and a vertical direction, and wherein the recontouring system comprises a material removal tool, and wherein the method further comprises:
adding a deposited material to the component prior to obtaining the data set, and wherein the deposited material extends along the vertical direction between a top and a bottom;
recontouring the first component machined prior to the component, the recontouring of the first component comprising:
obtaining, by the one or more computing devices, a first data set comprised of a plurality of first subsets, each first subset comprised of one or more first parameters indicative of a condition of one of the sections of the first component and a condition of the recontouring system;
inputting, by the one or more computing devices, the first data set into the machine-learned model comprised of the plurality of neural networks, each first subset being input into a respective neural network;
determining, by the one or more computing devices, a first machine offset for each first section of the first component based at least in part on the one or more first parameters indicative of the condition of the first section and the condition of the recontouring system;
obtaining, by the one or more computing devices, the first machine offset for each first section of the first component as outputs of their respective neural networks;
adjusting, by the one or more computing devices, a material removal tool path based at least in part on the first machine offsets; and
machining the first component utilizing the material removal tool path, wherein after machining, the component defines a regenerated portion and a non-regenerated portion;
performing the post-inspection process on the first component; and
wherein the one or more parameters indicative of the condition of one of the sections of the component include:
an angular deviation of the component with respect to the reference datum plane; and
a step position indicative of a distance between the top and the bottom of the deposited material,
wherein the parameter indicative of the condition of the recontouring system is one of a plurality of parameters indicative of the condition of the recontouring system used to determine, by the one or more computing devices, the machine offset for each section of the component, and wherein the plurality of parameters indicative of the condition of the recontouring system include:
a tool state indicative of a condition of the material removal tool.

15. A method for recontouring a blade of a gas turbine engine using a recontouring system, the blade defining a plurality of sections, the method comprising:
obtaining, by one or more computing devices, a data set comprised of a plurality of subsets, each subset corresponding to one of the plurality of sections of the blade and comprising one or more parameters indicative of a condition of the corresponding section of the blade and a condition of the recontouring system;
inputting, by the one or more computing devices, the data set into a machine-learned model comprised of a plurality of neural networks, each subset being input into a respective neural network;
determining, by the one or more computing devices, a machine offset for each section of the blade based at least in part on the one or more parameters indicative of the condition of the section and the condition of the recontouring system;
obtaining, by the one or more computing devices, the machine offset for each section of the blade as outputs of their respective neural networks;
adjusting, by the one or more computing devices, a material removal tool path of the recontouring system based at least in part on the machine offsets; and
machining the blade utilizing the material removal tool path, and
wherein the parameter indicative of the condition of the recontouring system is a measured step, wherein the measured step is measured during a post-inspection process of a first component defining one or more first sections, the first component being machined prior to the component by the recontouring system and defining a regenerated portion and a non-regenerated portion after being machined, the measured step being measured along the first component for each of the first sections as a distance between an edge of the non-regenerated portion to an edge of the regenerated portion.

16. The method of claim 15, wherein one of the parameters indicative of the condition of one of the sections of the blade is a twist angle.

17. The method of claim 15, wherein the blade defines a vertical direction, and wherein one of the parameters indicative of the condition of one of the sections of the blade is a length of the blade along the vertical direction.

18. The method of claim 15, wherein the blade is a compressor blade.

19. The method of claim 15, wherein the blade is a turbine blade.

* * * * *